July 17, 1951  L. H. GOOD  2,560,640
ELECTRONIC CONTROL CIRCUIT
Filed April 18, 1945
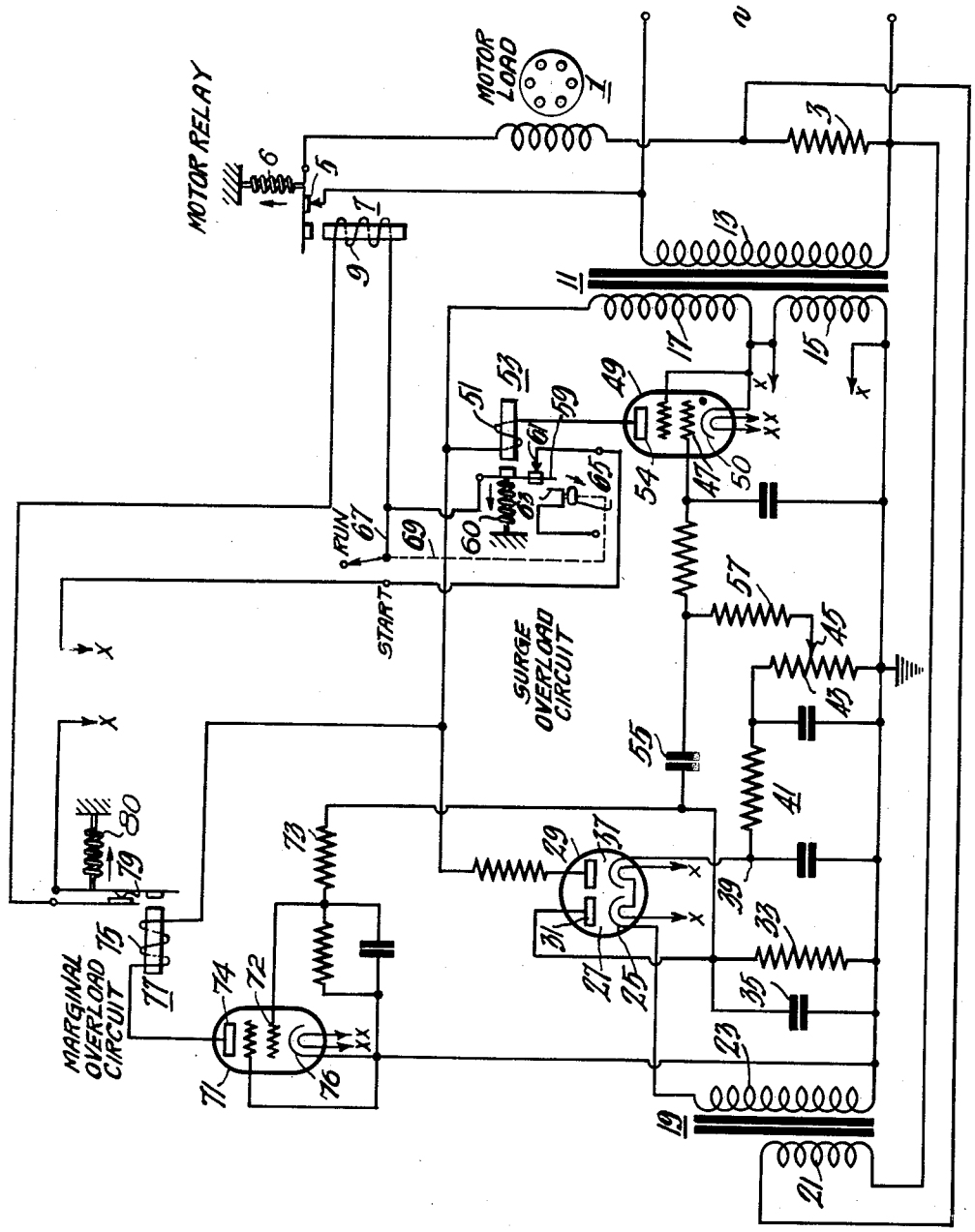
INVENTOR
*Lowell H. Good*
BY *C. D. Ducka*
ATTORNEY Patented July 17, 1951

2,560,640

UNITED STATES PATENT OFFICE 2,560,640

ELECTRONIC CONTROL CIRCUIT

Lowell H. Good, Riverton, N. J., assignor to Radio Corporation of America, a corporation of Delaware Application April 18, 1945, Serial No. 589,074

1 Claim. (Cl. 175—294)

This invention relates generally to electronic control systems and more particularly to a novel circuit for controlling the energization of a load device such as an electric motor, wherein the control system is independently operative either by marginal overload conditions or by surge overload conditions.

In the operation of electric motors employed to drive machinery subject to widely varying load requirements, it is essential that the motor circuit include overload control apparatus to prevent damage to the motor due to gradual or sudden increases in power dissipated in the motor due to variations in the loading thereof, or to prevent damage to the associated machinery when excessive power is applied thereto as in the case of breakdown of some machine component. Various types of overload control systems have been employed heretofore. Marginal overload systems inherently are too sluggish to operate satisfactorily under damaging surge overload conditions. Likewise, suitable surge overload systems provide troublesome interruptions in load energization which would not affect a marginal overload control circuit.

The instant invention comprises a novel electronic circuit which includes a thermionic tube relay circuit responsive to marginal overload conditions and a second thermionic tube relay circuit which is responsive only to surge overload conditions. The two control circuits cooperate to deenergize a motor load in the presence of either marginal or surge overload voltages. A novel relay circuit forming a portion of the surge overload control circuit provides lock-out operation each time the circuit operates, thereby preventing damage to the load motor due to a succession of dangerous power surges. An especially useful application of the invention is in controlling the motor drive of a bottling or bottle inspection machine wherein the machinery is subject to abnormal overloads in the cases of bottle breakage or jamming.

Among the objects of the invention are to provide an improved method of and means for controlling the energization of an electrical load device in response to marginal or surge power overload conditions. Another object of the invention is to provide an improved electronic overload control circuit having a marginal overload control element and a surge overload control element cooperating to control the energization of a load device. A further object of the invention is to provide an improved overload control circuit including a differentiating network for detecting surge overload conditions in a load device, and a relay circuit responsive to said differentiating circuit for deenergizing the load upon the occurrence of a single power surge. An additional object of the invention is to provide an improved overload control circuit responsive to marginal and surge overload conditions in a load device and operative to deenergize said load device in the presence of marginal or surge overloads or when said control circuit is deenergized or electrical elements thereof become inoperative. Another object is to provide an improved overload control system responsive to marginal or surge electrical overload conditions, wherein the load is deenergized upon removal or failure of tubes or failure of relays or control circuit power.

The invention will be described in greater detail by reference to the accompanying drawing of which the single figure is a schematic circuit diagram of a preferred embodiment thereof.

Referring to the drawing, a motor load 1 is energized from an alternating current source, not shown, and the motor circuit includes a small series resistor 3 and the contacts 5 biased normally open by a spring 6 of a motor relay 7 which includes a relay winding 9.

The overload control circuits include a power transformer 11 having a primary winding 13 connected to the source of alternating potential. A low voltage secondary winding 15 supplies current to the cathode heaters of the thermionic tubes of the control circuit and to the motor relay winding 9. A high voltage secondary winding 17 of the transformer 11 supplies high alternating potentials for the anode circuits of the overload control circuit tubes, whereby the circuit is entirely operative from the alternating potential source which drives the load motor 1.

An input transformer 19 has its primary winding 21 connected in parallel with the series resistor 3 in the load motor circuit. Thus, potentials characteristic of the power in the motor load may be derived from one terminal of a secondary winding 23 of the input transformer 19 and applied to the cathode 25 of a first diode section 27 of a double diode 29. The anode 31 of the first diode section 27 is connected to common terminals of a resistor 33 and bypass capacitor 35, the remaining terminals of which are connected to the other terminal of the secondary winding 23 of the input transformer 19. Thus, rectified potentials are derived across the resistor 33 corresponding to the power requirements of the motor load 1.

The high alternating potentials derived from the high voltage secondary winding 17 of the power transformer 11 are rectified by a second diode section 37 of the double diode 29 to provide positive rectified voltages at the point 39.

The positive rectified voltages at the point 39 are filtered by means of a low-pass filter 41 and applied to a voltage divider 43 which includes an adjustable tap 45 for applying variable positive bias potentials to the control grid 47 of a gaseous thermionic tube 49. The gaseous thermionic tube 49 has its cathode 50 connected to one terminal of the high voltage secondary winding 17 of the power transformer 11. The remaining terminal of the high voltage secondary winding 17 is connected through the winding 51 of a surge overload relay 53 to the anode 54 of the gaseous discharge tube 49.

Negative rectified potentials derived from the first diode section 27 of the double diode 29, and corresponding to the power requirements of the motor load 1, are also applied to the grid 47 of the gaseous thermionic tube 49 through a small series capacitor 55 which has a shunt-resistive path to ground through the resistors 57 and 43 in the grid circuit of the gaseous discharge tube. Voltage surges in the motor load circuit will provide negative voltage pulses upon the control grid 47 of the gaseous discharge tube 49 due to the differentiating action of the small series capacitor 55. The current through the capacitor is equal to its capacity multiplied by the derivative of the voltage applied thereto. In the absence of motor load voltage variations, substantially no current passes through the capacitor 55 due to the filtering action of the bypass capacitor 35 across the resistor 33. However, in the presence of sudden voltage surges in the motor load circuit, the current passed by the small series capacitor 55 will be proportional to the derivative of the voltage across the small series resistor 3 in the motor load circuit, and a negative voltage pulse will be applied to the grid 47 of the gaseous discharge tube 49. If the tap 45 on the voltage divider 43 is adjusted to place a positive potential upon the grid 47 of the gaseous discharge tube 49 sufficient to make the tube conduct on every positive half-cycle of the alternating anode supply voltage in the presence of normal motor load surges, then abnormally high motor load surges will generate sufficiently high negative bias voltages to block the current through the gaseous discharge tube 49 during any portion of the alternating cycle of the anode supply source.

The movable contact 59 of the surge overload relay 53 is biased normally open by a spring 60, contacts a fixed relay contact 61 when the relay is energized by the current through the gaseous discharge tube 49. These contacts are in series with the energizing circuit for the motor relay winding 9, whereby the motor is energized when the gaseous discharge tube 49 is conducting. However, abnormally high power surges in the motor circuit produce high negative potentials upon the control grid 47 of the gaseous discharge tube 49 as described heretofore, thereby deenergizing the surge overload relay 53 which deenergizes the motor relay winding 9, and hence deenergizes the motor load 1.

In order that a single pulse may permanently deenergize the motor load until the control circuit is reset, a locking contact 63 engages and locks the movable contact 59 of the surge overload relay 53 whenever the relay winding 51 is deenergized. Thus, the contacts 59, 61 may not again be closed to energize the motor relay circuit until such time as the locking contact 63 is disengaged from the movable contact 59. This operation may be performed manually by means of a control knob 65 attached to the locking contact 63, and movable in the direction indicated by the arrow adjacent thereto.

In order that the motor may be brought up to speed without operating the surge overload control circuits, a switch 67 is connected across the surge overload relay contacts 59, 61. When the motor has attained full speed and normal load conditions, the switch 67 may be opened to permit the surge overload relay 53 to control the motor relay circuit. If desired, the switch 67 and the control knob 65 of the locking contact 63 may be operated simultaneously as indicated by the dash line 69. It should be understood that a conventional polarized relay may be substituted for the locking contact relay in the surge overload circuit whereby the circuit may be unlocked by remote control means in a manner well known in the art.

In order that the control circuit also may be operative to deenergize the motor load 1 in the presence of marginal energy overload conditions, a marginal overload relay circuit includes a high-vacuum thermionic discharge tube 71 which has its control grid 72 connected through a grid resistor 73 to the anode 31 of the first diode section 27 of the double diode 29. Thus gradual increase in the voltage across the motor series resistor 3 provides a gradually increasing negative bias voltage which overcomes the zero voltage normally on the grid of the thermionic discharge tube 71. The anode 74 of the thermionic discharge tube 71 is energized by alternating potentials from the high voltage secondary winding 17 of the power transformer 11 through the winding 75 of a marginal overload relay 77. The cathode 76 of the tube is grounded to the low-potential terminal of the secondary winding 23 of the transformer 19.

The tube normally will conduct and close the relay contacts 79 which are normally biased open by the spring 80. However, when the negative bias voltage derived from the diode section 27 of the double diode 29 attains a sufficiently high value, the anode current is reduced below the value required to close the relay contacts 79. The marginal overload relay contacts 79 are connected in series with the low voltage secondary winding 15 of the power transformer 11, the contacts 59 and 61 of the surge overload relay 53, and the winding 9 of the motor relay 7. Thus opening of the contacts of the marginal overload relay 77, or of the contacts of the surge overload relay 53, will deenergize the winding 9 of the motor relay 7, and the motor relay contacts 5 will be opened and will deenergize the motor load 1. Hence either marginal overload conditions or surge overload conditions in the motor load circuit will deenergize the motor. Also a surge overload will permanently deenergize the motor circuit until such time as the surge overload relay is reset. This latter condition is essential in order that the surge overload relay will not "chatter" subsequently to operation by a motor load surge. Such chattering of the surge overload contact would be detrimental to the motor load relay contacts which are required to pass relatively high currents.

If the locking contact 65 is omitted from the surge overload relay 53, improved operation is obtained if the motor relay 7 has a relatively high inertia armature and a powerful armature spring, whereby the motor contacts are closed slowly and opened relatively rapidly with respect to the operating time of the contacts of the surge overload relay 53.

Thus the invention described comprises a novel load control circuit responsive both to marginal and surge overload conditions, wherein the surge overload circuit includes a differentiating network and a gaseous discharge tube responsive thereto, and the surge overload and marginal overload circuits include power control relays having their contacts connected in series with the load control circuit.

I claim as my invention:

A control system for a load energized from an A. C. power source comprising a source of A. C. potential for energizing said control system, an impedance serially connected with said load such that the potential across said impedance is proportional to the A. C. load current, means stepping up said potential and isolating said stepped-up potential from said energizing potential and from said power source, means rectifying said stepped-up potential such that a D. C. negative potential is produced which is proportional to said load current, a thermionic discharge tube, including a control grid, means applying a normal positive D. C. biasing potential to said control grid for maintaining said tube normally conductive, a relay connecting said load to said power source when said tube is conductive and disconnecting said load when said tube is nonconductive, and means applying said negative D. C. potential to said control grid only during periods when a rapid increase in potential occurs across said impedance, whereby said tube is rendered non-conductive.

LOWELL H. GOOD.

REFERENCES CITED

The following references are of record in the file of this patent:

UNITED STATES PATENTS

| Number | Name | Date |
|---|---|---|
| 991,189 | Barnum | May 2, 1911 |
| 1,124,599 | Fessenden | Jan. 12, 1915 |
| 1,320,125 | Chubb | Oct. 28, 1919 |
| 1,427,368 | Fortescue | Aug. 29, 1922 |
| 1,685,949 | Fortescue | Oct. 2, 1928 |
| 1,715,684 | Thomas | June 4, 1929 |
| 1,728,745 | Brown | Sept. 17, 1929 |
| 1,854,965 | Traver | Apr. 19, 1932 |
| 2,030,107 | Gilliksen | Feb. 11, 1936 |
| 2,175,889 | Forbes | Oct. 10, 1939 |
| 2,383,600 | Grosdoff | Aug. 28, 1945 |
| 2,458,454 | Winther | Jan. 4, 1949 |
| 2,473,344 | McCown | June 14, 1949 |